United States Patent

Stahlecker

[11] Patent Number: 6,033,121
[45] Date of Patent: Mar. 7, 2000

[54] SUPPORTING DISK FOR A SUPPORTING DISK BEARING OF AN OPEN-END SPINNING ROTOR AND METHOD OF MAKING SAME

[75] Inventor: Gerd Stahlecker, Eislingen/Fils, Germany

[73] Assignee: Novibra GmbH, Suessen, Germany

[21] Appl. No.: 09/064,134

[22] Filed: Apr. 22, 1998

[30] Foreign Application Priority Data

May 10, 1997 [DE] Germany .......................... 197 19 791

[51] Int. Cl.$^7$ .................................................. F16C 19/50
[52] U.S. Cl. ........................ 384/549; 57/405; 57/406; 57/407
[58] Field of Search .................... 384/549, 565; 57/405, 406, 407

[56] References Cited

U.S. PATENT DOCUMENTS 5,178,473   1/1993   Oexler et al. .

*Primary Examiner*—Lenard A. Footland
*Attorney, Agent, or Firm*—Evenson, McKeown, Edwards & Lenahan, P.L.L.C.

[57] ABSTRACT

The supporting disks for supporting disk bearings of open-end spinning rotors comprise a tire or ring with damping properties, as well as an essentially cylindrical running surface. In order to avoid heat build-up, the running surface is interrupted by two grooves, thus dividing the running surface into one inner and two outer sectional surfaces. The outer sectional surfaces are each wider than the inner sectional surface by 20 to 40%.

28 Claims, 2 Drawing Sheets

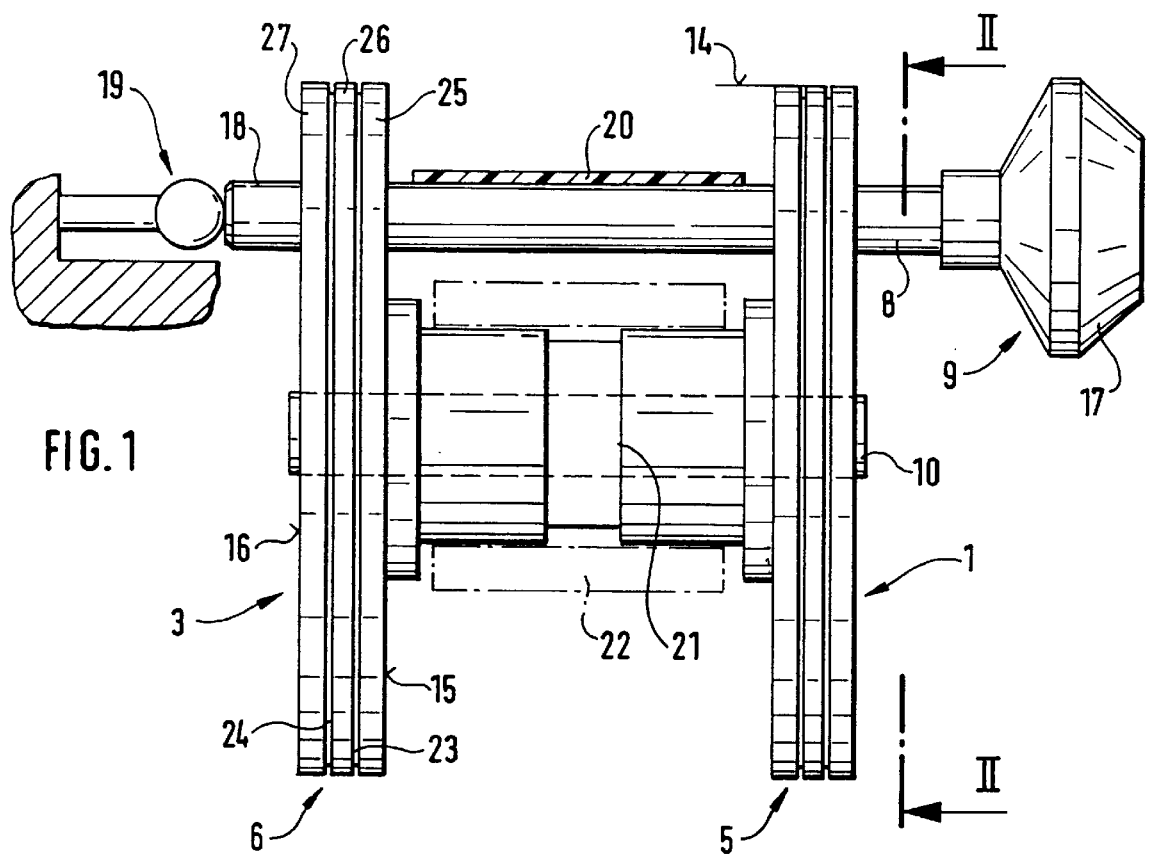
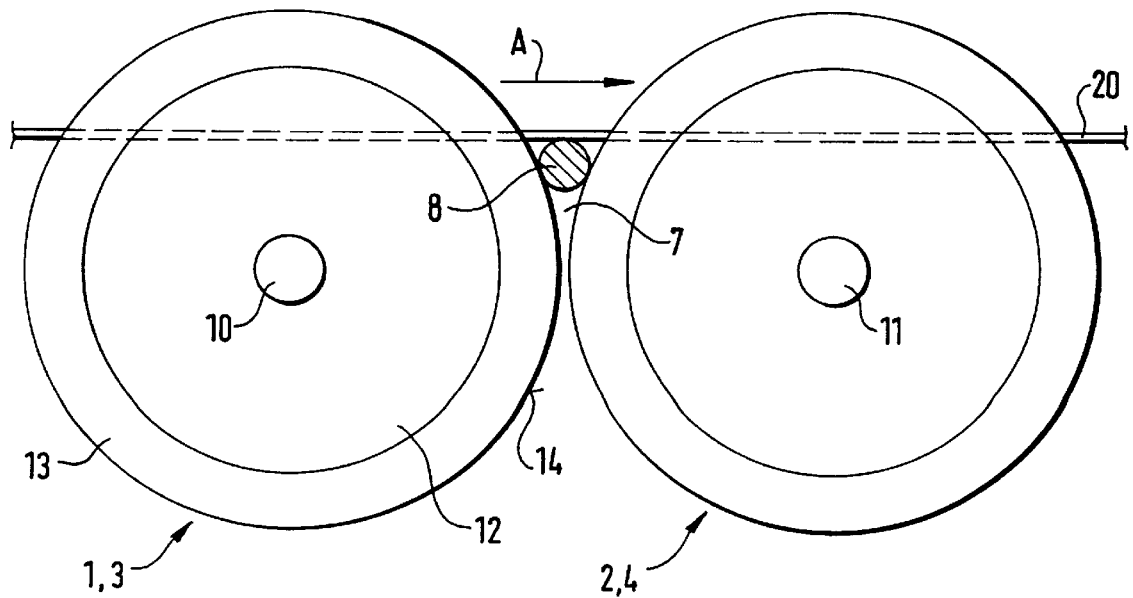

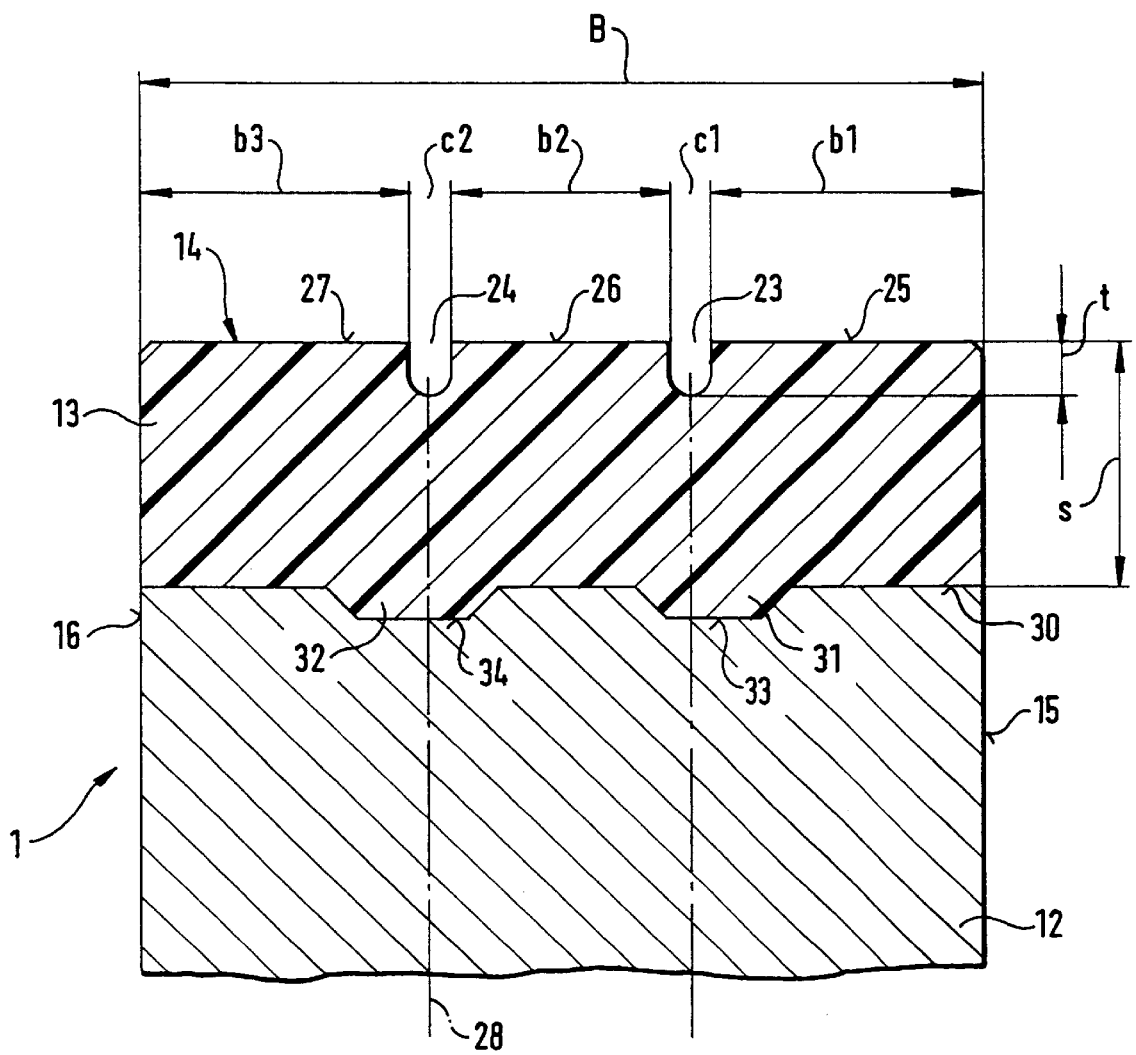

SUPPORTING DISK FOR A SUPPORTING DISK BEARING OF AN OPEN-END SPINNING ROTOR AND METHOD OF MAKING SAME

BACKGROUND AND SUMMARY OF THE INVENTION

This application claims the priority of application 197 19 791.4 filed in Germany of May 10, 1997, the disclosure of which is expressly incorporated by reference herein.

The present invention relates to a supporting disk for a supporting disk bearing of open-end spinning rotors, said disk comprising a tire (annular ring) with damping properties, which comprises an essentially cylindrical running surface limited by outer edges. The running surface is divided into sectional surfaces by endless grooves, extending in circumferential direction parallel to one another.

The annular ring, usually made of plastic, of supporting disks for high-speed open-end spinning rotors are also subjected, in addition to the mechanical load caused by the rotor shaft, to a high thermal load. Both types of load are contrary to one another, whereby with increasing width of the running surface, the thermal load increases and the mechanical load decreases. In order to reduce the thermal load, in practical machines the center of the running surfaces of the supporting disks are interrupted by a groove extending in circumferential direction.

U.S. Pat. No. 5,178,473 teaches that in addition to the centrically arranged groove, two further grooves are provided extending parallel to the central groove, so that the running surface is divided into two inner and two outer sectional surfaces. Thus the inner sectional surfaces located between two grooves are significantly wider than the outer sectional surfaces located respectively between a groove and an outer edge. Thus not only is the fact that the outer sectional surfaces are subjected to a higher mechanical load overlooked, but also thermal calculations show that the known arrangement of the grooves is in no way optimal with regard to avoiding heat build-up.

It is an object of the present invention to find a usable compromise for practical operation with regard to the thermal and mechanical loads of the supporting disks, thereby accommodating the thermal load, particularly dangerous for practical operation, by optimizing the arrangement of the grooves.

This object has been achieved in accordance with the present invention in that the running surface is interrupted by two grooves, thus dividing the running surface into one inner sectional surface located between the grooves and two outer sectional surfaces located between a groove and an outer edge respectively, and that each outer sectional surface is wider than the inner sectional surface.

Two grooves result firstly in the operational temperature of the running surface being lower than when only one single groove is present. The second groove also reduces the flexing work on the running surface, so that also in this respect a longer working life than that of supporting disks used in practical operation up to now can be expected. By means of the distribution of the sectional surfaces, as opposed to the above mentioned prior art, a significant reduction of the thermal load of the running surface also occurs. Calculations have shown that a relatively even distribution of temperature on the running surface can only than be achieved when the outer sectional surfaces are made wider than the inner sectional surface. One reason for this is that the running surfaces are cooled better during operation at the outer edges than in the area of the grooves. As the wider outer sectional surfaces are also favorable with regard to the mechanical load, the arrangement of the two grooves according to the present invention leads to a surprising result, namely that now the mechanical and thermal load are no longer contrary to one another, but rather that the arrangement of the present invention reduces the thermal and the mechanical load.

It has been established that the outer sectional surfaces may be 20 to 40% wider than the inner sectional surface according to preferred advantageous embodiments of the invention. In especially preferred advantageous embodiments, the tire or annular ring is made of a material with a hardness of Shore D between 49 and 55, and the width of the central portion between the two grooves is approximately 75% of the width of each of each of the outer sectional surfaces. Together the outer sectional surfaces may be wider than the inner sectional surface plus the two grooves, whereby for manufacturing reasons, the outer sectional surfaces can be made equally wide.

It is sufficient when the width of each groove is very small, the distance between the two outer edges should measure 10 times the width of one groove. The chosen width of the grooves lies between 0.7 mm and 1 mm, whereby the optimum lies around 0.8 mm. The width of the running surface between the outer edges lies advantageously between 7 and 10 mm.

The depth of the grooves need not be overly deep. The depth of the grooves is only slightly larger than their width, so that an almost square cross section arises, which may be rounded on the groove bottom. The grooves should have a depth which corresponds to a quarter of the thickness of the annular support ring. Rings with a thickness of 4 mm have been proven to be favorable. At this thickness, the damping properties of the annular support ring are still adequate, while the amount of plastic used is small.

In a further embodiment of the present invention, in particular in the case of somewhat wider running surfaces, the annular support ring in the area of the radial planes of the grooves can be additionally provided on its inner circumference with ribs, which engage in corresponding anchoring grooves of a disk-like base body of the supporting disk. The annular support ring is thus—as seen in cross section reinforced by ribs at those points where the grooves are located in the running surface. In the case of relatively narrow running surfaces the annular support ring may be affixed to a disk-like metal base body without any anchoring groove at all.

As the shaft, supported by the supporting disks, of an open-end spinning rotor in practical operation is disposed mostly at the outer edges of the supporting disks, the outer sectional surfaces can be advantageously bordered by small bevels in the area of the outer edges. The mechanical load is thus reduced at the particularly critical points of the outer edges.

BRIEF DESCRIPTION OF THE DRAWINGS

These and further objects, features and advantages of the present invention will become more readily apparent from the following detailed description thereof when taken in conjunction with the accompanying drawings wherein:

FIG. 1 is a sectional longitudinal view of a supporting disk bearing comprising the supporting disks according to the present invention;

FIG. 2 is a view along the intersection surface II—II of FIG. 1; and

FIG. 3 is a greatly enlarged sectional view of FIG. 1 of a supporting disk of the present invention.

DETAILED DESCRIPTION OF THE DRAWINGS

The supporting disk bearing for open-end spinning machines as shown in FIGS. 1 and 2 comprises four supporting disks 1,2,3 and 4, which are arranged in pairs. The two pairs 5 and 6 form wedge-shaped gaps 7, in which the shaft 8 of an open-end spinning rotor 9 is supported. The supporting disks 1,3;2,4 located each on one side beside the shaft 8 are arranged on a joint axle 10 or 11.

The supporting disks 1,2,3 and 4 are essentially similar. They consist of a metal disk-shaped base body 12, whose outer circumference is provided with an annular support ring or tire 13 with damping properties. The four annular ring members 13 each form an essentially cylindrical running surface 14 for the shaft 8 of the open-end spinning rotor 9.

The running surface 14 is bordered on both sides by outer edges 15 and 16. Each annular support ring 13 is made of an elastomer plastic.

The shaft 8 of the open-end spinning rotor 9 supports a rotor cup 17 at one end. The other end of the shaft 8 is supported against a step bearing 19.

The shaft 8 is loaded with a tangential belt 20, which extends in travel direction A in longitudinal direction of the open-end spinning machine and thus drives the open-end spinning rotors 9 of at least one machine side.

The supporting disk bearing is arranged in such a way that it is suitable for rotations of the open-end spinning rotor 9 in the order of magnitude of 150,000 rpm. The diameter of the shaft 8 lies thus in the order of 8 mm. The supporting disks 1,2,3 and 4 have an outer diameter on their running surfaces 14 of preferably 78 mm. The thickness of the annular support ring 13, which measures 4 mm, is adapted to this outer diameter. The width of the running surface 14 lies in the order of 7 to 10 mm.

The supporting disks 1, 2, 3 and 4 are provided with a centrical bore hole (not shown), by means of which the supporting disks 1, 2, 3 and 4 are placed onto the relevant axles 10 and 11. The axles 10 and 11 are in turn taken up by a bearing housing 21, to which is arranged a joint bearing support 22 (shown only by a dot-dash line), which is affixed to the machine frame.

The running surfaces 14 of the supporting disks 1, 2, 3 and 4 are interrupted by two parallel extending and identically dimensioned endless grooves 23, 24, which run through in circumferential direction and which divide the running surface 14 into three sectional surfaces 25,26 and 27. An inner sectional surface 26 is thus located between the grooves 23 and 24 and, between respectively one groove 23,24 and one outer edge 15,16 on the other hand an outer sectional surface 25, 27 is located.

The two grooves 23 and 24 noticeably reduce the heat load of the tire 13.

FIG. 3 shows a cut sectional view in the area of the annular ring 13 of a greatly enlarged supporting disk 1, whereby it could, of course also be one of the other supporting disks 2,3, or 4.

It can be seen from FIG. 3 that the width B of the running surface 14 is divided by the two grooves 23 and 24 in three sectional surfaces 25,26 and 27. The arrangement is such that the inner sectional surface 26 located between the grooves 23 and 24 is narrower than the two outer sectional surfaces 25 and 27. To what extent the widths b1 and b3 of the outer sectional surfaces 25 and 27 should be larger than the width b2 of the inner sectional surface 26 depends for one thing on the width B of the running surface 14 as well as the thickness s of the annular ring 13. By means of appropriate dimensions, at least an approximately uniform heat load in the areas of the three sectional surfaces 25,26 and 27 is achievable. As the outer sectional surfaces 25 and 27 are wider than the inner sectional surface 26, the additional mechanical load is accommodated, as the mechanical load in the area of the outer edges 15 and 16 is greater than in the area of the inner sectional surface 26.

The widths c1 or c2 of the grooves 23 and 24, which are identical, measure in the order of 0.7 to 1 mm, preferably 0.8 mm. The depth t of the grooves 23 and 24 exceeds the respective widths c1, c2 only slightly and measures in the area of 1 mm. The bottom of the grooves 23 and 24 can, as shown, be rounded. The cross section of the grooves 23 and 24 is however, essentially square. In the case of a preferred annular supporting thickness s of 4 mm, the depth t of the grooves 23 and 24 measures thus a quarter of the thickness s.

It has been established as advantageous that when the width B of the running surface 14 lies in the standard area of 7 to 10 mm, that each outer sectional surface 25,27 is approximately 20 to 40% wider than the inner sectional surface 26. It is generally practical to have the two outer sectional surfaces 25 and 27 equally wide, whereby the widths b1 and b3, taken together, are wider than the width b2 of the inner sectional surface 26 plus the widths c1 and c2 of the grooves 23 and 24. The distance between the two outer edges 15 and 16 measures approximately 10 times the width c1, c2 of a groove 23,24. The reason for this approximate dimension is that deviations caused by tolerance may be acceptable. In certain especially preferred embodiments, the width b2 in approximately 75% of each of the widths b1 and 53, and the annular ring 13 has a hardness of Shore D between 49 and 55.

In the area of the radial planes 28, denoted by dot-dash lines, of the grooves 23 and 24, the tire 13 is provided on its inner circumference 30 with two ribs 31 and 32, which have a height of approximately 1 mm. The width of the ribs 31 and 32 is identical and somewhat smaller than the inner sectional surface 26.

The ribs 31 and 32 serve not only to reinforce the cross section of the annular support ring 13 at those points where the grooves 23 and 24 are located, but also to anchor the plastic tire 13 to the metal base body 12, which is preferably made of an aluminum alloy. This anchoring is than particularly practical when the width B is relatively large. The ribs 31 and 32 engage in corresponding anchoring grooves 33 and 34 of the base body 12 of the supporting disk 1. An improved hold is thus achieved when the annular support ring 13 is injected onto the base body 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A supporting disk for a supporting disk bearing for open-end spinning rotors, said supporting disk comprising an annular supporting ring with damping properties, which has an essentially cylindrical running surface bordered by outer edges, which running surface is divided by two endless grooves, extending parallel to one another in circumferential direction, wherein the running surface is thus divided into an inner sectional surface located between the grooves and into two outer sectional surfaces each located respectively between one groove and one outer edge, and wherein each outer sectional surface is wider than the inner sectional surface.

2. A supporting disk according to claim 1, wherein each outer sectional surface is 20 to 40% wider than the inner sectional surface.

3. A supporting disk according to claim 2, wherein the annular ring is provided on its inner circumference in an area of radial planes of the grooves with ribs, which ribs engage in corresponding anchoring grooves of a disk-like base body of the supporting disk.

4. A supporting disk according to claim 2, wherein the grooves have a depth which corresponds to approximately a quarter of the thickness of the annular supporting ring.

5. A supporting disk according to claim 4, wherein the annular ring is provided on its inner circumference in an area of radial planes of the grooves with ribs, which ribs engage in corresponding anchoring grooves of a disk-like base body of the supporting disk.

6. A supporting disk according to claim 2, wherein the grooves have an almost square cross section.

7. A supporting disk according to claim 6, wherein the grooves have a depth which corresponds to approximately a quarter of the thickness of the annular supporting ring.

8. A supporting disk according to claim 6, wherein the annular ring is provided on its inner circumference in an area of radial planes of the grooves with ribs, which ribs engage in corresponding anchoring grooves of a disk-like base body of the supporting disk.

9. A supporting disk according to claim 2, wherein the distance between the two outer edges is approximately 10 times the width of each of one of the grooves.

10. A supporting disk according to claim 2, wherein the inner sectional surface is approximately 75% as wide as each of the respective outer sectional surfaces.

11. A supporting disk according to claim 10, wherein the grooves have a depth which corresponds to approximately a quarter of the thickness of the annular supporting ring.

12. A supporting disk according to claim 10, wherein the annular ring is provided on its inner circumference in an area of radial planes of the grooves with ribs, which ribs engage in corresponding anchoring grooves of a disk-like base body of the supporting disk.

13. A supporting disk according to claim 10, wherein the distance between the two outer edges is approximately 10 times the width of each of one of the grooves.

14. A supporting disk according to claim 10, wherein the grooves have an almost square cross section.

15. A supporting disk according to claim 2, wherein the outer sectional surfaces are identically wide and, taken together, are wider than the inner sectional surface plus the two grooves.

16. A supporting disk according to claim 1, wherein the outer sectional surfaces are identically wide and, taken together, are wider than the inner sectional surface plus the two grooves.

17. A supporting disk according to claim 16, wherein the distance between the two outer edges is approximately 10 times the width of each of one of the grooves.

18. A supporting disk according to claim 17, wherein the grooves have an almost square cross section.

19. A supporting disk according to claim 16, wherein the grooves have an almost square cross section.

20. A supporting disk according to claim 16, wherein the grooves have a depth which corresponds to approximately a quarter of the thickness of the annular supporting ring.

21. A supporting disk according to claim 16, wherein the annular ring is provided on its inner circumference in an area of radial planes of the grooves with ribs, which ribs engage in corresponding anchoring grooves of a disk-like base body of the supporting disk.

22. A supporting disk according to claim 1, wherein the distance between the two outer edges is approximately 10 times the width of each of one of the grooves.

23. A supporting disk according to claim 22, wherein the grooves have an almost square cross section.

24. A supporting disk according to claim 22, wherein the grooves have a depth which corresponds to approximately a quarter of the thickness of the annular supporting ring.

25. A supporting disk according to claim 22, wherein the annular ring is provided on its inner circumference in an area of radial planes of the grooves with ribs, which ribs engage in corresponding anchoring grooves of a disk-like base body of the supporting disk.

26. A supporting disk according to claim 1, wherein the grooves have an almost square cross section.

27. A supporting disk according to claim 1, wherein the grooves have a depth which corresponds to approximately a quarter of the thickness of the annular supporting ring.

28. A supporting disk according to claim 1, wherein the annular ring is provided on its inner circumference in an area of radial planes of the grooves with ribs, which ribs engage in corresponding anchoring grooves of a disk-like base body of the supporting disk.

* * * * *